(12) United States Patent
Hinderthür et al.

(10) Patent No.: US 11,233,564 B1
(45) Date of Patent: Jan. 25, 2022

(54) METHOD AND DEVICE FOR MIGRATING DATA TRAFFIC FROM AN EXISTING OPTICAL WDM TRANSMISSION SYSTEM TO A NEW OPTICAL WDM TRANSMISSION SYSTEM

(71) Applicant: ADVA Optical Networking SE, Meiningen (DE)

(72) Inventors: Henning Hinderthür, Finning (DE); Christian Scheerer, Neuried (DE); Christophe Meyer, Meiningen (DE)

(73) Assignee: ADVA Optical Networking SE, Meiningen (DE)

( * ) Notice: Subject to any disclaimer, the term of this patent is extended or adjusted under 35 U.S.C. 154(b) by 0 days.

(21) Appl. No.: 17/315,408

(22) Filed: May 10, 2021

(51) Int. Cl.
  *H04J 14/02* (2006.01)
  *H04B 10/079* (2013.01)
  (Continued)

(52) U.S. Cl.
  CPC ...... *H04B 10/0793* (2013.01); *H04J 14/0278* (2013.01); *H04L 47/122* (2013.01);
  (Continued)

(58) Field of Classification Search
  CPC ..... H04B 10/0793; H04B 10/40; H04L 47/16; H04L 47/122; H04J 14/0278; H04J 14/02
  (Continued)

(56) References Cited

U.S. PATENT DOCUMENTS

| | | | |
|---|---|---|---|
| 6,580,548 B2 * | 6/2003 | Islam | H01S 3/302 359/334 |
| 6,614,567 B1 * | 9/2003 | Al-Salameh | H04J 14/02 398/79 |

(Continued)

OTHER PUBLICATIONS

Niven-Jenkins, "Network Convergence onto an All-Optical Backbone", The Journal of The Communication Network, Oct.-Dec. 2003, pp. 35-39, vol. 2, Part 4.

*Primary Examiner* — Dibson J Sanchez
(74) *Attorney, Agent, or Firm* — The Webb Law Firm

(57) ABSTRACT

The invention relates to a method for migrating data traffic from an existing optical WDM transmission system to a new optical WDM transmission system, the existing optical WDM transmission system using a first optical transmission band and the new optical WDM transmission system being capable of using a second optical transmission band. The second optical transmission band at least partially includes the first optical transmission band and a further extension band that does not overlap with the first optical transmission band, the method including the steps of. According to the invention, a migration filter device is used in order to connect, during a migration phase, the network nodes of the existing system and the network nodes of the new system to the network paths that have been used by the existing system. During the migration phase, both systems are operated in parallel, with the new system using the extension band only. In this way, during the migration phase, the data traffic handled by the existing system can stepwise be switched to the new system. After all data traffic has been switched to the new system, the existing system can be deinstalled. The migration filter devices can stepwise be deinstalled.

20 Claims, 6 Drawing Sheets

(51) Int. Cl.
*H04L 12/803* (2013.01)
*H04L 12/801* (2013.01)
*H04B 10/40* (2013.01)

(52) U.S. Cl.
CPC .............. *H04L 47/16* (2013.01); *H04B 10/40* (2013.01); *H04J 14/02* (2013.01)

(58) Field of Classification Search
USPC .............................. 398/25, 43–103, 135–139
See application file for complete search history.

(56) References Cited

U.S. PATENT DOCUMENTS

| | | | | |
|---|---|---|---|---|
| 6,885,499 | B1* | 4/2005 | Hoshida | H04B 10/2942 359/337 |
| 7,254,336 | B2 | 8/2007 | Harney et al. | |
| 7,302,176 | B2* | 11/2007 | Sakano | H04B 10/032 398/148 |
| 7,546,034 | B2* | 6/2009 | Mueller | H04B 10/032 398/5 |
| 8,477,596 | B2* | 7/2013 | Trisno | H04Q 11/0062 370/217 |
| 9,749,080 | B2* | 8/2017 | Lam | H04J 14/0221 |
| 11,063,672 | B2* | 7/2021 | Levesque | H04Q 11/0005 |
| 11,063,684 | B2* | 7/2021 | Karube | H04J 14/0212 |
| 2002/0076143 | A1* | 6/2002 | Foltzer | H04J 14/028 385/24 |
| 2002/0141008 | A1* | 10/2002 | Chbat | H04B 10/2941 398/26 |
| 2002/0154359 | A1* | 10/2002 | Tsuda | H04J 14/0213 359/337.13 |
| 2002/0181061 | A1* | 12/2002 | Uda | H04J 14/0221 398/141 |
| 2004/0001715 | A1* | 1/2004 | Katagiri | H04B 10/2916 398/81 |
| 2004/0161232 | A1* | 8/2004 | Kerfoot, III | H04J 14/0295 398/5 |
| 2004/0252996 | A1* | 12/2004 | McNicol | H04J 14/0224 398/79 |
| 2005/0024715 | A1* | 2/2005 | Inoue | H04J 14/0221 359/337 |
| 2006/0062576 | A1* | 3/2006 | Nakamura | H04J 14/0294 398/72 |
| 2006/0104638 | A1* | 5/2006 | Chung | H04J 14/0295 398/71 |
| 2006/0133804 | A1* | 6/2006 | Boduch | H04J 14/0295 398/5 |
| 2006/0239609 | A1* | 10/2006 | Sorin | H04J 14/025 385/24 |
| 2007/0258716 | A1* | 11/2007 | Barbieri | H04J 14/0278 398/79 |
| 2012/0039605 | A1* | 2/2012 | Zhu | H04J 14/0226 398/58 |
| 2012/0087658 | A1* | 4/2012 | Jander | H04Q 11/0005 398/48 |
| 2012/0201542 | A1* | 8/2012 | Dahlfort | H04J 14/0282 398/70 |
| 2013/0039656 | A1* | 2/2013 | Lam | H04J 14/0235 398/47 |
| 2013/0266318 | A1* | 10/2013 | Abdul Manaf | H04J 14/0293 398/48 |
| 2015/0244494 | A1* | 8/2015 | Grobe | H04J 14/025 398/68 |
| 2019/0165878 | A1* | 5/2019 | Huang | H04J 14/0239 |
| 2019/0222506 | A1 | 7/2019 | Lee et al. | |
| 2019/0386767 | A1* | 12/2019 | Yuki | H04J 14/0227 |
| 2019/0393975 | A1 | 12/2019 | Badar et al. | |
| 2020/0153502 | A1* | 5/2020 | Buset | H04B 10/03 |
| 2021/0050929 | A1* | 2/2021 | Nakamura | H04B 10/67 |

\* cited by examiner

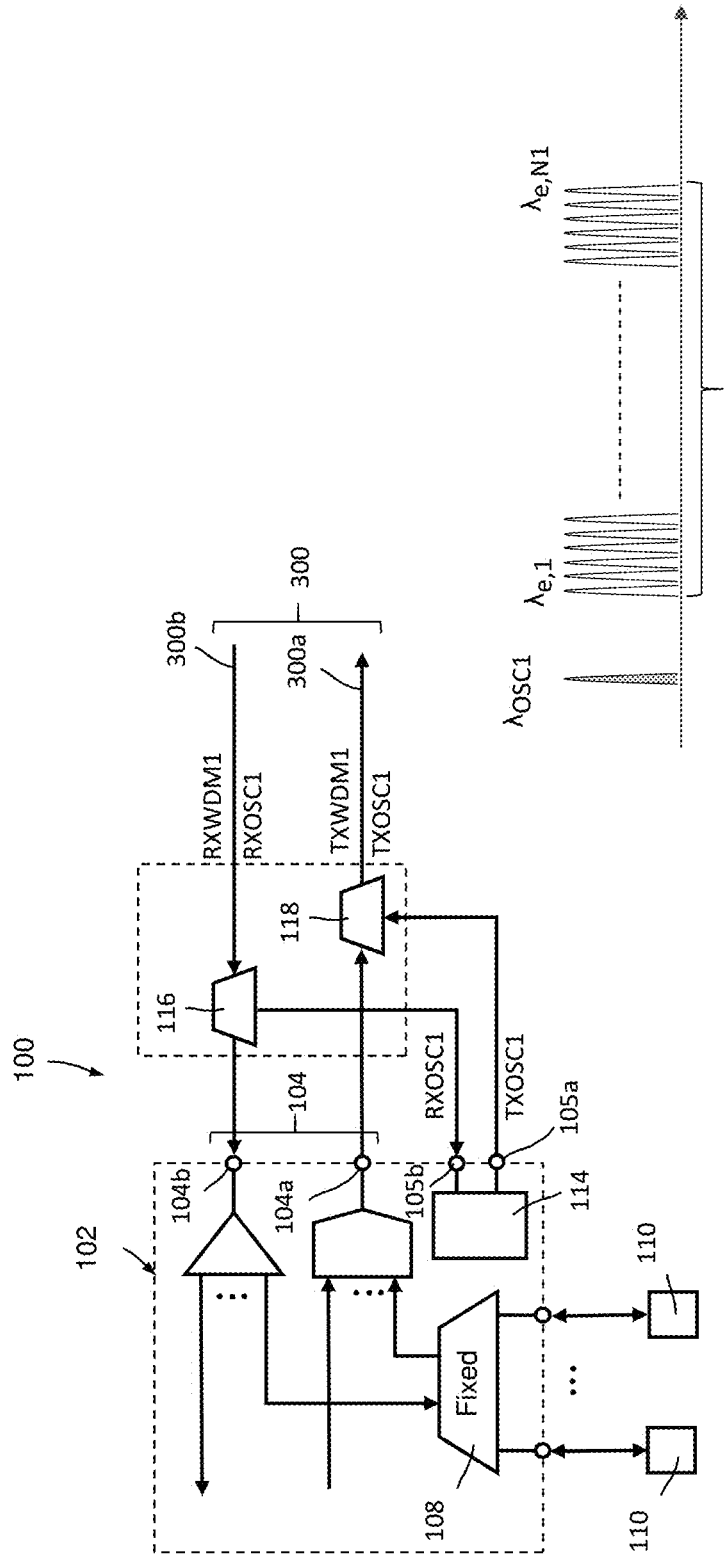

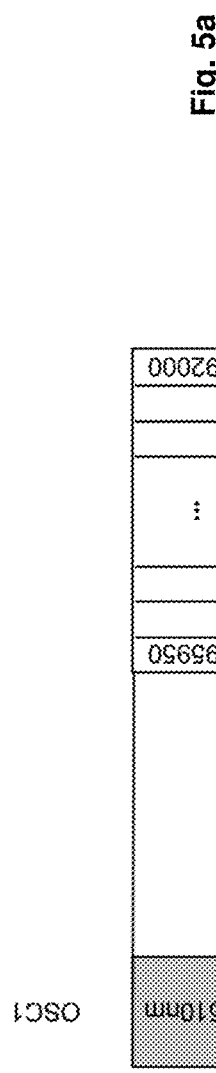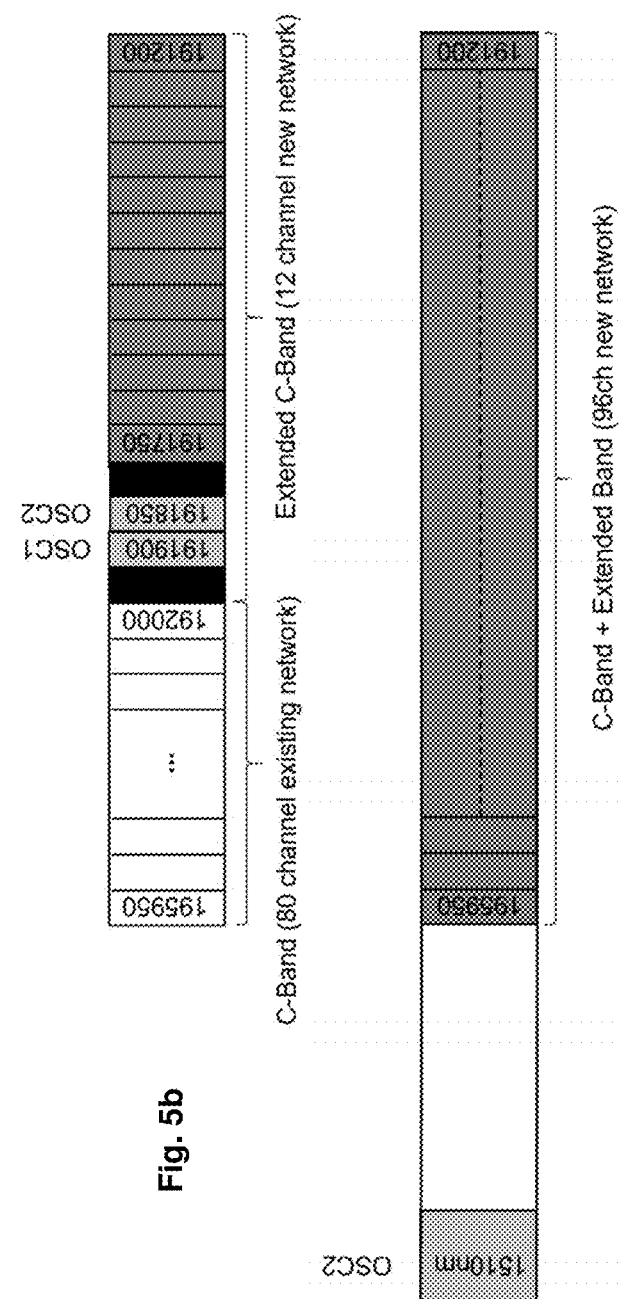

METHOD AND DEVICE FOR MIGRATING DATA TRAFFIC FROM AN EXISTING OPTICAL WDM TRANSMISSION SYSTEM TO A NEW OPTICAL WDM TRANSMISSION SYSTEM

CROSS-REFERENCE TO RELATED APPLICATION

This application claims priority to European Patent Application No. 20 184 579.9 filed Jul. 7, 2020, the disclosure of which is hereby incorporated by reference in its entirety.

BACKGROUND OF THE INVENTION

Field of the Invention

The invention relates to a method for migrating data traffic from an existing optical WDM transmission system to a new optical WDM transmission system. The invention further relates to a specific migration filter device for implementing this new method.

Description of Related Art

Generally, each network node of an existing optical WDM transmission system that is realized by a specific hard- and/or software, or more specifically each network interface of each network node, is connected to a dedicated optical network path. The optical network path is usually formed by a pair of optical fibers, wherein one of the fibers serves for transmitting the respective downstream WDM signal and, as the case may be, an additional downstream optical supervisory channel (OSC) signal and the other fiber serves for transmitting the respective upstream WDM signal and, as the case may be, an additional upstream OSC signal. It is, however, also possible that the optical network path consists of a single optical fiber, wherein the optical paths of the downstream and upstream signals are combined and separated in the network node or network interface by suitable optical means, for example an optical diplexer. Such an existing optical WDM transmission system transmits a certain amount of data traffic over a set of WDM wavelengths forming a set of WDM channels. The channel spacings and optical frequencies may be arranged according to ITU-T G.694.1, which defines the DWDM grid.

If such an existing optical WDM transmission system shall be replaced by a new, more modern system which has an increased transmission capacity, the new system is supposed to take over all the data traffic from the existing system.

In the following, the term "data traffic" shall be understood to comprise all user traffic caused by traffic relations irrespective of whether the traffic relations form unidirectional or bidirectional point-to-point or point-to-multipoint transmissions. Apart from this data traffic, each optical WDM transmission system transmits management information in an OSC, i.e. this management traffic is transmitted in addition to the data traffic.

The task to migrate an existing optical WDM transmission system to a new system which is not downwards compatible with the existing system has usually been solved by spending a further optical path, i.e. a further (new) pair of fibers, on all routes in the network. The new optical WDM transmission system connects to the second pair of fibers while the existing optical WDM transmission system continues to operate on the respective (first) fiber pair. Using such two independently operating networks (i.e. the respective system and the respective optical paths), user traffic can get disconnected from the existing optical WDM transmission system and connected to and re-established on the new optical WDM transmission system.

The disadvantage of this migration solution is that a further optical path (comprising a pair of optical fibers, one of the fibers being used for the downstream and the other of the fibers being used for the upstream direction, or a single optical fiber being used for the upstream and the downstream direction) is required on all routes of the network. If no further optical path is available (e.g. if the respective optical cable does not comprise a further pair or a further single optical fiber), a new optical cable must be installed, which causes high additional effort and high additional costs, or the existing optical WDM transmission system must completely (i.e. all network nodes thereof) be disconnected from and the new optical WDM transmission system must then be connected to the existing optical path. This, however, leads to a long outage time as the new optical WDM transmission system does not only have to be installed at each network node location, which may be far apart, but also all the existing traffic must be switched to the new optical WDM transmission system.

SUMMARY OF THE INVENTION

Thus, it is an object of the present invention to provide a method for migrating data traffic from an existing optical WDM transmission system to a new optical WDM transmission system that is easy to implement, that does not require an additional optical path on all network routes and that enables a minimum outage time. It is a further object of the invention to provide an optical migration filter device for implementing the method according to the invention.

The invention achieves these objects as described herein. Further embodiments of the invention are apparent from the description herein.

The invention starts from the finding that the new optical WDM system and the existing optical WDM system can operate using the same optical network paths on all routes between the network nodes of the whole network if the new optical WDM system uses, during the migration phase in which both systems are operated simultaneously, an optical extension band that does not overlap with the optical band used by the existing optical WDM system. After having switched all the data traffic to the new optical WDM system, the existing optical WDM system can be disconnected from the network paths and the new optical WDM system can use the whole optical band (completely or partly including the optical band that has been used by the existing optical WDM system) in order to provide an increased transmission capacity. Of course, the new optical WDM system must be capable of transmitting the whole data traffic of the existing optical WDM system in the extension band.

That is, the existing optical WDM transmission system uses a first optical transmission band (which may comprise a single continuous wavelength range or two or more separate wavelength ranges) and the new optical WDM transmission system is capable of using a second optical transmission band (which may also comprise a single continuous wavelength range or two or more separate wavelength ranges), wherein the second optical transmission band at least partially comprises the first optical transmission band and a further extension band that does not overlap with the first optical transmission band. In this description, the term "optical transmission band" designates an optical band in which the communication channels of the respective optical WDM transmission system lie. In addition to the communication channels, an optical WDM transmission system usually uses an optical supervisory channel at a predetermined wavelength. Thus, the whole optical band used by the existing and the new optical WDM transmission system comprises the respective optical transmission band and the wavelength of the respective OSC channel.

The method according to the present invention comprises the following steps:

In a first step, at each network node location, a network node of the new optical WDM transmission system is set up in parallel to a respective network node of the existing optical WDM transmission system. Further, in this first step, each network interface of the respective network node of the existing optical WDM transmission system is disconnected from a respective optical network path and each respective optical network path and each respective network interface are connected to an associated optical migration filter device. It is not necessary that, during this first step, the new optical WDM system, i.e. the network nodes thereof, is put into operation. This can be done when the data traffic is switched from the existing optical WDM system to the new optical WDM system (see below). However, it is of course also possible to put into operation each network node of the new optical WDM system right after having installed it.

Each optical migration filter device is adapted to direct incoming data traffic that is received via the respective optical network path and that uses the extension band to the network node of the new optical WDM transmission system, to direct outgoing data traffic originating from the network node of the new optical WDM transmission system that uses the extension band to the respective optical network path, to direct incoming data traffic that is received via the respective optical network path and that does not use the extension band to the network node of the existing optical WDM transmission system, and to direct outgoing data traffic originating from the network node of the existing optical WDM transmission system to the respective optical network path. Thus, the optical migration filter makes it possible to operate both the existing and the new optical WDM transmission system on the same optical network paths.

For the duration of a migration phase, the existing and the new optical WDM transmission system are operated simultaneously, wherein the new optical WDM transmission system uses the extension band only. It is not necessary that all of the network nodes of the new optical WDM transmission system have been set up during the whole duration of the migration phase. For example, at the beginning of the migration phase, it is sufficient to have installed and to operate only two of the network nodes of the new optical WDM transmission system. Already in such an intermediary state it is possible to switch the data traffic caused by traffic relations between these two nodes from the existing to the new system (see below). However, at least at the end of the migration phase, the new optical WDM transmission system must be fully operative, as in this status the new system has taken over all traffic relations of the existing system. Likewise, the existing optical WDM system can be taken out of operation stepwise. Each network node of the existing system can be taken out of operation and each network interface thereof can be disconnected from the respective optical migration filter device if all the traffic relations handled by the respective network node (i.e. all the data traffic that is created at, received at or passed through the respective node) have been switched to the respective network node of the new system. If an OSC is handled by the respective node of the existing system and this functionality cannot be taken over by the remaining network nodes of the existing system, the respective network node must be kept in operation, even if all the user traffic has been switched to the respective network node of the new system.

In this way, during the migration phase, all traffic relationships handled by the existing optical WDM transmission system can be switched to the new optical WDM transmission system. Finally, at each network node location, all optical migration filter devices can be removed and all optical network paths can be connected to the respective network interfaces of the network node of the new optical WDM transmission system when all traffic relationships handled by the respective node or when all traffic relationships handled by the existing optical WDM transmission system have been switched to the new optical WDM transmission system.

According to an embodiment of the invention, each network node of the new optical WDM transmission system may have the ability to take over the whole functionality of the respective node of the existing optical WDM transmission system as far as transmitting the respective traffic relationships is concerned, including the ability to connect a respective number of local clients to a given number of local communication ports, wherein each communication port is configured to enable at least one client to receive data traffic from and/or transmit data traffic to at least one predetermined network interface of the network node.

According to a further embodiment, each of the existing and the new optical WDM transmission systems uses an optical supervisory channel at a predetermined wavelength outside the respective optical transmission band. During the migration phase, the wavelength of the optical supervisory channel signal transmitted by at least one of the existing or new optical WDM transmission systems is shifted by the optical migration filter device to a respective differing conversion wavelength by converting the respective optical supervisory channel signal into an electrical signal and converting the electrical signal into an optical signal at the respective conversion wavelength. Likewise, the optical supervisory channel signals that have been transmitted over the optical network paths and that are received by a migration filter device are reconverted to the "original" wavelength of the OSC channel used by the existing or new system. This makes it possible that the new optical WDM transmission system uses an optical supervisory channel at the same wavelength as the existing system. Further, shifting one or both wavelengths of the optical supervisory channels during the migration phase can be used to simplify the structure of the optical migration filter device.

If required or advantageous, both optical supervisory channels may be shifted to conversion wavelengths in a frequency range neighboring the extension band or neighboring the first optical transmission band.

The existing and the new optical WDM transmission systems may use an optical supervisory channel at the same non-converted wavelength.

As already mentioned, shifting one or both of the OSC wavelengths to respective conversion wavelengths may result in a simpler structure of the optical migration filter device. Especially, the conversion wavelengths can be shifted to outermost ranges of the first and/or second optical transmission band. This allows to extract the respective OSC signal by means of a simple optical filter, especially by an optical diplexer, i.e. an optical filter having an edge filter characteristic between a multiplex port and each of two splitting or combining ports, namely, a low-pass filter characteristic between the multiplex port and one of the two splitting or combining ports and a high-pass filter characteristic between the other one of the two splitting or combining ports.

According to an embodiment of the invention, the conversion wavelengths of the optical supervisory channel of the existing and the new optical WDM transmission system are chosen in such a way that they lie within the extension band, wherein, preferably, the wavelengths of all optical communication channels of new optical WDM transmission system lie on one side of the conversion wavelengths. This last property makes it possible to use a simple combining/separating filter means, e.g. an optical diplexer, for multiplexing the wavelength-converted downstream OSC signals and the downstream channel signals of the new system and to demultiplex the wavelength-converted upstream OSC signals and the upstream channel signals of the new system within the optical migration filter device.

An optical migration filter device suitable for realizing the method according to the invention comprises a first local port adapted to be connected to a first local optical path and to receive a first downstream WDM signal lying in a first optical band and to output a first upstream WDM signal lying in the first optical band, a second local port adapted to be connected to a second local optical path and to receive a second downstream WDM signal lying in a second optical band and to output a second upstream WDM signal lying in the second optical band, wherein the second optical band does not overlap with the first optical band, and a remote port adapted to be connected to an optical network path and to receive an upstream WDM signal comprising the upstream WDM signals lying in the first and second optical bands as well as to output a downstream WDM signal comprising the downstream WDM signals lying in the first and second optical bands. The optical migration filter device is adapted to combine the first and second downstream WDM signals and to output the combined downstream WDM signal at the remote port and to separate a combined upstream WDM signal into the first and second upstream signals and to output these signals at the respective first and second port.

The optical migration filter device is further adapted to convert the wavelength of a first downstream optical supervisory channel signal that is supplied to the first local port or to a separate first OSC port into a predetermined conversion wavelength and to output the wavelength-converted first downstream optical supervisory channel signal at the remote port, and to convert a conversion wavelength of a first wavelength-converted upstream optical supervisory channel signal that is supplied to the remote port into a wavelength of a first upstream optical supervisory channel signal and to output the wavelength-converted first upstream optical supervisory channel signal at the first local port or at the first OSC port; and/or to convert the wavelength of a second downstream optical supervisory channel signal that is supplied to the second local port or to a separate second OSC port into a predetermined conversion wavelength and to output the wavelength-converted second downstream optical supervisory channel signal at the remote port, and to convert a conversion wavelength of a second wavelength-converted upstream optical supervisory channel signal that is supplied to the remote port into a wavelength of a second upstream optical supervisory channel signal and to output the wavelength-converted second upstream optical supervisory channel signal at the second local port or at the second OSC port. For this purpose, the optical migration filter device may comprise an appropriate optical-to-electrical-to-optical converter which comprises, for each wavelength to be converted and each transmission direction (downstream or upstream), an optical receiver for converting the respective optical signal into an electrical signal and an optical transmitter for converting the electrical signal into an optical signal at the desired wavelength.

As mentioned above, the optical migration filter device may be configured to be used to migrate an existing optical WDM transmission system to a new optical WDM transmission system which both use the existing optical paths between the network nodes of the systems, wherein each of the existing optical paths may comprise a single optical path that is used for the downstream and the upstream transmission direction or two separate optical paths each of which is exclusively used for one of the transmission directions.

In the latter case, each of the ports comprises a respective pair of input and output ports, i.e.

each of the first and second local ports comprises an input port for receiving the first and second downstream WDM signals via a respective first and second downstream path of the first and second local optical paths that can be connected to the respective input port, and an output port for feeding the first and second upstream WDM signals via a respective first and second upstream path of the first and second optical paths that can be connected to the respective output port, the remote port comprises an output port for feeding the downstream WDM signal comprising the first and second downstream WDM signals and the first and second downstream optical supervisory channel signals to a downstream optical network path that can be connected to this output port, and an input port for receiving the upstream WDM signal comprising the first and second downstream WDM signals and the first and second upstream optical supervisory channel signals via an upstream optical network path that can be connected to this input port, and each of the optional first and second OSC ports (if available, i.e. if the OSC signals are not fed to the optical migration filter device via the other ports) comprises an input port for receiving the respective first and second downstream optical supervisory channel signal via a respective first or second downstream OSC path that can be connected to the respective input port, and an output port for feeding the respective first and second upstream optical supervisory channel signal to a respective first or second upstream OSC path that can be connected to the respective output port.

In such embodiments, each optical migration filter device may comprise a downstream migration filter device and an upstream migration filter device. In one alternative, two separate devices for connecting each network interface of the existing and new system to the respective optical downstream or upstream transmission path may be used. In another alternative, both functionalities may be integrated into a single device.

According to an embodiment of the invention, the downstream migration filter device may comprise a first optical combining filter means having a first and a second combining port and a multiplex port, the first combining port defining the or being connected to the input port of the first local port via a first optical downstream path, the second combining port defining the or being connected to the input port of the second local port via a second optical downstream path, and the multiplex port defining the or being connected to the output port of the remote port via a third optical downstream path, wherein the first optical combining filter means is configured to output optical signals lying in the first optical band and received at the first combining port and optical signals lying in the second optical band and received at the second combining port at the multiplex port and to reflect or drop all other signals received at the first or second combining port, and an optical-to-electrical-to-optical converter device configured to receive the first and/or the second downstream optical supervisory channel signal at a respective first or second input port, to create the first and/or the second wavelength-converted downstream optical supervisory channel signal and to feed one or both of the wavelength-converted downstream optical supervisory channel signals to a second optical combining filter means.

The second optical combining filter means may be provided exclusively within the first optical downstream path if the first and/or second conversion wavelength lies in the first optical band, exclusively within the second optical downstream path if the first and/or second conversion wavelength lies in the second optical band, or within the first and the second optical downstream path if the conversion wavelengths lie in different ones of the first and second optical bands.

In these embodiments, the second optical combining filter means is configured to integrate the first and/or the second wavelength-converted downstream optical supervisory channel signal into the first and/or second optical downstream path.

The second optical combining filter means may comprise, for each downstream optical supervisory channel to be wavelength-converted, an optical diplexer, which is configured to multiplex the respective downstream optical supervisory channel signal that is supplied to the respective optical diplexer and the respective optical signal that is guided in the first or second optical downstream path and supplied to the respective optical diplexer.

According to an embodiment of the invention, the downstream migration filter device may comprise a demultiplexing filter means which is provided in the first and/or second optical downstream path and which is configured to extract the first and/or the second downstream optical supervisory channel signal from the first and/or second optical upstream path and to feed the first and/or the second downstream optical supervisory channel signal to the optical-to-electrical-to-optical converter device.

According to an embodiment of the invention, the upstream migration filter device may comprise a first optical demultiplexing filter means having a first and a second demultiplex port and a multiplex port, the first demultiplex port defining the or being connected to the output port of the first local port via a first optical upstream path, the second demultiplex port defining the or being connected to the output port of the second local port via a second optical upstream path, and the multiplex port defining the or being connected to the input port of the remote port via a third optical upstream path, wherein the first optical demultiplexing filter means is configured to output optical signals lying in the first optical band and received at the multiplex port at the first demultiplex port and to output optical signals lying in the second optical band and received at the multiplex port at the second demultiplex port and to reflect or drop all other signals received at the multiplex port, and an optical-to-electrical-to-optical converter device configured to receive the first and/or the second wavelength-converted upstream optical supervisory channel signal at a respective first and second input port from a second optical demultiplexing filter means.

The second optical demultiplexing filter means may be provided exclusively within the first optical upstream path if the first and/or second conversion wavelength lies in the first optical band, exclusively within the second optical upstream path if the first and/or second conversion wavelength lies in the second optical band, or within the first and the second optical upstream path if the conversion wavelengths lie in different ones of the first and second optical bands.

In these embodiments, the second optical demultiplexing filter is configured to extract the first and/or the second wavelength-converted upstream optical supervisory channel signal from the first and/or second optical upstream path and to feed the first and/or the second wavelength-converted upstream optical supervisory channel signal to the optical-to-electrical-to-optical converter device.

The second optical demultiplexing filter means may comprise, for each wavelength-converted upstream optical supervisory channel, an optical diplexer, which is configured to extract, from the optical signal that is guided in the first and/or second optical upstream path, the first and/or second upstream optical supervisory channel signal and to feed the first and/or second upstream optical supervisory channel signal to the optical-to-electrical-to-optical converter device.

According to a further embodiment, the upstream migration filter device may comprise a multiplexing filter means which is provided in the first and/or second optical upstream path and which is configured to receive, from the optical-to-electrical-to-optical converter device, the re-converted first and/or the second upstream optical supervisory channel signal and to integrate these signals into the first and/or second optical upstream path.

It shall be mentioned that any combining or demultiplexing filter means or devices used in an optical migration filter device according to the present invention may be realized as an optical diplexer if the wavelengths of the first and/or second (downstream or upstream) OSC signals are chosen in such a way that the wavelength of the respective OSC signal lies outside the bandwidth covered by the optical signal that is to be combined with the respective OSC signal or from which the respective OSC signal is to be separated. As optical diplexers are simpler to produce and thus less costly than optical filters providing a narrow-band filter characteristic, the use of diplexers is an effective means to reduce the costs of an optical migration filter device.

BRIEF DESCRIPTION OF THE DRAWINGS

In the following, the invention will be described in more detail with reference to the drawings. In the drawings, FIG. 1 shows a schematic block diagram of a network node of an existing optical WDM transmission system, wherein only a single one of an arbitrary number of network interfaces is illustrated, which is connected to a dedicated optical network path;

FIG. 2 shows a diagram illustrating the optical band used by an existing optical WDM transmission system comprising network nodes as illustrated in FIG. 1;

FIGS. 5a-c shows three schematic diagrams illustrating the use of the optical bands before or at the very beginning of the migration phase (FIG. 5a), during the migration phase (FIG. 5b) and at the very end or after the migration phase (FIG. 5c);

DESCRIPTION OF THE INVENTION

Figures 3, 4:
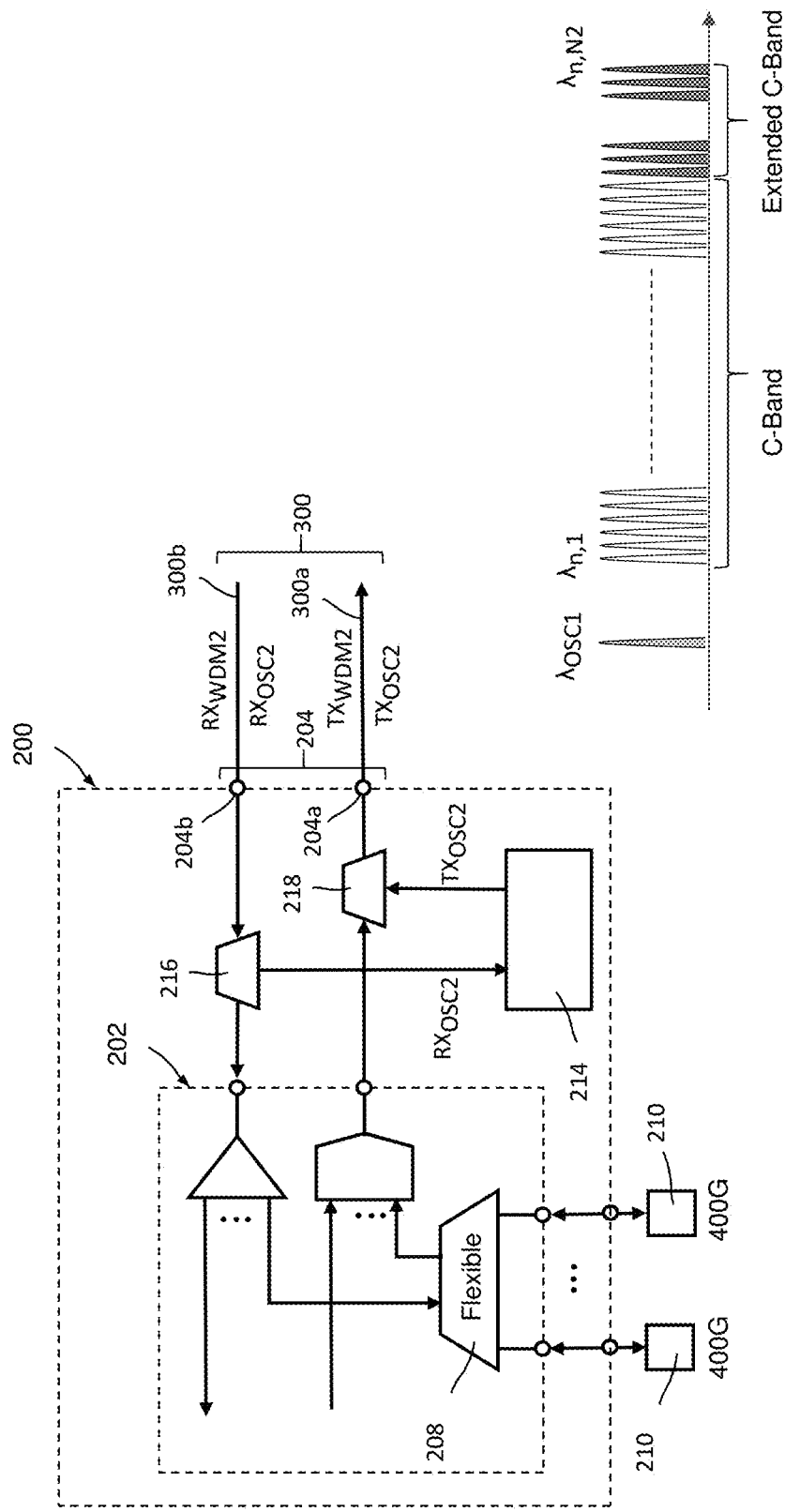
FIG. 3 shows a schematic block diagram of a network node of a new optical WDM transmission system, wherein only a single one of an arbitrary number of network interfaces is illustrated, which is configured to be connected to the same dedicated optical network path as the network node shown in FIG. 1.
FIG. 4 shows a diagram illustrating the optical band used by the new optical WDM transmission system comprising network nodes as illustrated in FIG. 3.

FIG. 1 shows a network node 100 of an existing optical WDM transmission system, wherein only a single network interface 102 of an arbitrary number of network interfaces is shown. In practice, each network node 100 may comprise two network interfaces, which are often referred to as "Eastern" and "Western" interfaces. Such network nodes are used in linear network structures, e.g. ring-type network structures. However, especially in fully meshed optical networks, higher order network nodes with an arbitrary number of network interfaces may be used (usually a nomenclature is used in which the number of network interfaces defines the order of the network node).

As shown in FIG. 1, the network node 100 of the existing optical WDM transmission system creates a downstream WDM signal $TX_{WDM1}$ which is supplied to a dedicated optical network path 300 and an upstream WDM signal $RX_{WDM1}$ which is supplied to the dedicated optical network path 300. In all embodiments shown in the drawings, the optical network path 300 comprises a downstream path 300a and an upstream path 300b which are separate from each other and are usually formed by a respective optical fiber. It is, however, also possible to use an optical network path consisting of a single path, e.g. an optical fiber, which is used for both transmission directions. The network node 100 shown in FIG. 1 comprises a WDM interface port 104 that is realized by an output port 104a for feeding the downstream WDM signal $TX_{WDM1}$ to the respective downstream path 300a and an input port 104b for receiving the upstream WDM signal $RX_{WDM1}$ from the respective upstream path 300b. That is, the network node 100 is configured to be connected to an optical path consisting of separate downstream and upstream paths.

The network node 100 may be realized as reconfigurable optical add-/drop-multiplexer (ROADM) which may comprise, for each network interface 102, a wavelength-selective switch 106 that receives partial WDM signals from other network interfaces 102 of the network node 100 (or, as the case may be, corresponding single channel signals on separate optical paths) and a partial WDM signal created by a multiplexing and demultiplexing device 108, e.g. comprising one or more AWGs, having a fixed grid, corresponding to the channel grid used by the existing optical WDM transmission system. The fixed grid may, for example, have a channel spacing of 50 or 100 GHz. The multiplexing and demultiplexing device 108 is connected to a predetermined number of clients 110, wherein each client 110 receives a channel signal at a given channel wavelength from the multiplexing and demultiplexing device 108 and transmits a channel signal at a given wavelength to the multiplexing and demultiplexing device 108. In this way, the wavelength-selective switch 106 creates the downstream WDM signal $TX_{WDM1}$ in such a way that it comprises all data traffic that is intended to be fed to the respective downstream path 300a. The network interface 102 further comprises an optical switch 112 which receives, from the respective upstream path 300b, all data channels included in the upstream WDM signal $RX_{WDM1}$. The split signal is supplied to the multiplexing and demultiplexing device 108 and to each of the further network interfaces 102. The multiplexing and demultiplexing device 108 demultiplexes the respective WDM signal and each of the respective channel signals to the respective client 110. As indicated in FIG. 1, a first number of clients 110 of the existing optical WDM transmission system may be configured to transmit and receive channel signals at a data rate of 10 Gbit/s whereas another number of clients 110 may be configured to transmit and receive channel signals at the data rate of 100 Gbit/s.

The network node 100 of the existing optical WDM transmission system further comprises, for each network interface 102, a control and management device 114, which is configured to create and transmit a downstream OSC signal $TX_{OSC1}$ and to receive an upstream OSC signal $RX_{OSC1}$ of a first OSC channel OSC1. The OSC signals $TX_{OSC1}$ and $RX_{OSC1}$ are transmitted via the respective optical upstream and downstream path 300b in addition to the respective WDM signal $TX_{WDM1}$ and $RX_{WDM1}$. The OSC signal $RX_{OSC1}$ is separated from the combined signals in the upstream path 300b by an optical filter means 116, e.g. an optical diplexer. The optical filter means 116 receives the upstream WDM signal $RX_{WDM1}$ and the upstream OSC signal $RX_{OSC1}$ at a common port or multiplex port that is connected to the upstream path 300b and outputs the upstream WDM signal $RX_{WDM1}$ at a first demultiplex port, which is connected to the input port 104b of the WDM interface port 104 of the network interface 102. The upstream OSC signal $RX_{OSC1}$ is output at a second demultiplex port of the optical filter means 116 and fed to an input port 105b of an OSC port 105 of the network interface 102, which is connected to an input port of the control and management device 114.

Likewise, the downstream OSC signal $TX_{OSC1}$ created by the control and management device 114 is output at an output port 105a of the OSC port 105 of the network interface 102 and integrated into the downstream path 300a (i.e. combined with the downstream WDM signal $TX_{WDM1}$) by means of a further optical filter means 118, e.g. an optical diplexer, which receives, at a first splitting port, the downstream OSC signal $TX_{OSC1}$ and, at a second splitting port, the downstream WDM signal $TX_{WDM1}$. The combined signal is output at a multiplex port of the optical filter means 118 that is connected to the downstream path 300a.

The optical filter means 116, 118 can only be realized by an optical diplexer if the wavelength of the OSC channel OSC1 does not lie within the optical band that is covered by the channel signals of the downstream and upstream WDM signals $TX_{WDM1}$ and $RX_{WDM1}$, respectively.

However, it is a common measure to choose the wavelength of such separate OSC channel signals (that are not integrated into the WDM signals, e.g. by amplitude-modulating the respective WDM signal) in such a way that it is distant from the optical bandwidth used for the WDM signals.

As indicated by the dashed block in FIG. 1 comprising the optical filter means 116, 118, referred to as OSC filter means 120, such OSC filter means may be realized separate from the other components of the network node 100. Such OSC filter means 120, which are required for each network interface 102, may be separate units that are configured to be connected to the WDM port 104, the OSC port 105 and the optical network path 30 by respective optical paths, e.g. optical patch cables. This makes it possible to directly connect the WDM and OSC ports 104, 105 of each network interface 102 during the migration phase to a respective migration filter device (FIG. 6) and to omit the OSC filter means 120. This reduces the total insertion loss and, as the migration filter device 400 also comprises a filter means for combining the signal paths of the signals created by the existing and the new optical WDM transmission system, omitting the OSC filter means 120 compensates the insertion loss of this filter means of the migration filter device (see the explanation below).

FIG. 2 shows a schematic diagram illustrating the wavelengths of the optical channel signals of the downstream and upstream WDM signals $TX_{WDM1}$ and $RX_{WDM1}$ and the wavelength of the downstream and upstream OSC signals $TX_{OSC1}$, $RX_{OSC1}$. As shown in FIG. 2, all N1 channel signals and the OSC signals (downstream and upstream) may have assigned wavelengths $\lambda_{e,1}$ to $\lambda_{e,N1}$ and $\lambda_{OSC1}$ lying in the optical C-band.

When the transmission capacity of the existing optical WDM transmission system can no longer meet increasing demands, is necessary to replace the existing optical WDM transmission system by a new optical WDM transmission system having a sufficient transmission capacity, which hopefully meets at least the medium term requirements.

Often, appropriate new optical WDM transmission systems having a sufficiently high transmission capacity are incompatible with the existing system to be replaced. This makes it impossible to simultaneously operate both systems using the existing optical network paths. This incompatibility is especially caused by the fact that, due to a limited optical bandwidth (appropriate for optical transmission) of a given optical path, a new optical WDM transmission system also uses, at least if in full operation, the optical band that is used by the existing optical WDM transmission system.

In many cases, a new optical WDM transmission system having a higher transmission capacity will have the ability to use a broader optical band than the existing optical WDM transmission system. Further, the new system may have the ability to increase the transmission capacity of one, more or all channels, e.g. by using coherent transmission and detection. Finally, a new system may be more flexible with respect to the transmission capacity of the single channels. Especially a new system may use a flexible DWDM grid as defined in ITU-T G.694.1.

FIG. 3 shows a network node 200 of a new optical WDM transmission system, wherein only a single network interface 202 of an arbitrary number of network interfaces is shown. The general structure of the network node 200 is similar to the structure of the network node 100 shown in FIG. 1 so that all above explanations with respect to the network node 100 are also valid for the network node 200, especially as far as the functionality of an ROADM is concerned. Corresponding components of the network node 200 are designated by corresponding reference numerals which are in the region of 200-300 instead of the region 100-200 (i.e. the components of the node 200 are designated with reference numerals increased by 100 as compared to the corresponding components of the node 100).

A minor difference between the network node 200 and the network node 100 is that the network node 200 does not comprise a separate filter means comprising the respective filter means 216 and 218. In other words, the network node 200 does not have separate WDM and OSC ports but a common connection port 204, only, which comprises a respective output port 204a and a respective input port 204b. The connection port 204 is connected to the optical path 300.

The decisive difference between the nodes 200 and the nodes 100 is that the transmission capacity of a network node 200 is considerably higher than the transmission capacity of a network node 100. For example, each network node 200 may be configured to connect a given number of clients which provide a transmission capacity of 400 Gbit/s (indicated by the abbreviated form "400 G" in FIG. 3).

A further advantage of the network nodes 200 of the new optical WDM transmission system may be that each node is capable of flexibly configuring the bandwidth of each channel. In this way, it is possible to assign a predetermined channel bandwidth and therefore a corresponding predetermined transmission capacity to each or at least to selected channels or clients, respectively.

Generally, each network node 200 is configured to create downstream and upstream WDM signals $TX_{WDM2}$, $RX_{WDM2}$ and downstream and upstream OSC signals $TX_{OSC2}$, $RX_{OSC2}$ which are fitted to and received from the same optical network paths 300 as the respective downstream and upstream WDM signals $TX_{WDM1}$, $RX_{WDM1}$ and downstream and upstream OSC signals $TX_{OSC1}$, $RX_{OSC1}$ of the network nodes 100 of the existing optical WDM transmission system.

As shown in FIG. 4, each network node 200 is capable of using the full bandwidth that is also used by the network nodes 100 of the existing optical WDM transmission system (e.g. the optical C-band) and in addition a further optical band (e.g. the extended optical C-band), which, in the following, is referred to as extension band. Like each network node 100, each network node 200 transmits and receives downstream and upstream WDM signals $TX_{WDM2}$, $RX_{OSC2}$ and a maximum number N2 of respective channel signals included therein at wavelengths $\lambda_{n,1}$ to $\lambda_{n,N2}$ as well as OSC channel signals (downstream and upstream direction) at a wavelength $\lambda_{OSC2}$. As apparent from FIG. 4, a given number of channels is provided within the extension band.

As will become obvious in the description of the migration process, the total transmission capacity of each node 200 in the extension band, i.e. the sum of the transmission capacities of each channel defined in the extension band is so high that the whole data traffic (and, as the case may be, the data traffic of the OSC) which is handled by the existing system can be handled by the new system using only the extension band.

In the following, the method used in order to migrate from the existing optical WDM transmission system comprising nodes 100 to the new optical WDM transmission system comprising nodes 200 is explained.

In a first step, at each network node location, a network node 200 of the new system is installed in parallel to the network node 100 of the existing system. Having installed a respective network node 200, the respective network node 100 is, with respect to each network interface, disconnected from the optical network path 300.

In a next step, the network node 200 and the network node 100 are connected to an optical migration filter device 400, which is explained in more detail in the description below. The optical migration filter device 400 is connected to the respective optical network path 300. This can be done without putting each of the network nodes 200 into operation, i.e. without putting the new optical WDM transmission system into operation. Each of the optical migration filter devices 400 is configured in such a way that, after having connected the respective network node 100 with its respective network interface, the respective network node 100 is fully operable. As this additional installation (and, at the end of the migration phase, deinstallation) of the optical migration filter devices 400 can be carried out in a short time, a very low outage during the migration phase can be obtained. The process of installing the optical migration filter devices 400 required at all of the network node locations can be carried out step by step without affecting the total outage.

In a further step, the new optical WDM transmission system is put into operation. This can of course be done simultaneously for all of the network nodes 200 or for one or more groups of network nodes 200.

Then, starting at one or more network locations, the data traffic handled by the existing system can stepwise be switched to the new system. During this phase, the clients 210 take over all traffic and services of the clients 110. As already mentioned above, this change is effected in such a way that each of the network nodes 200 uses, during the whole migration phase, exclusively the extension band (as the case may be, the OSC of the new system may comprise a wavelength different from the wavelength of the existing system and outside of the first and second optical transmission band).

This makes it possible to simultaneously operate both optical WDM transmission systems during the migration phase. The data traffic that has not yet been switched to the new system is still transmitted within the optical band used by the existing system, whereas the data traffic that has already been switched to the new system is transmitted within the extension band.

When the whole traffic that has originally been handled by the existing optical WDM transmission system has been switched to the new system (it might of course also be possible to handle additional traffic by the new system if its transmission capacity within the extension band is sufficiently high), at each network location for each of the network interfaces, the respective network nodes 100 and 200 as well as the respective optical path 300 can be disconnected from the respective optical migration filter device 400 and the respective network node 200 can be connected to the respective optical migration filter device 400. Again, this can be done step by step at each network location. The respective network node 100 of the existing optical WDM transmission system, which is no longer required, can be put out of operation and deinstalled.

After this migration phase, the new optical WDM transmission system, which is not solely connected to the optical network paths 300, can of course use the whole optical band.

The use of the optical band before, during and after the migration phase is shown in FIG. 5. FIG. 5a shows, as an example, the optical band used by the existing optical WDM transmission system. In this embodiment, the existing system uses 80 channels lying in the optical C-band. Instead of channel wavelengths $\lambda_{e,1}$ to $\lambda_{e,N1}$, FIG. 5a shows the optical frequencies $f_{e,1}$ to $f_{e,N1}$ of the optical channel signals in GHz. The channel spacing is 50 GHz. The wavelength of the OSC signal is 1510 nm.

The optical band used by the new optical WDM transmission system is shown in FIG. 5c. This optical band covers the whole band of the existing system, i.e. the C-band and the extension band, i.e. the extended C-band. In the embodiment shown, the new system provides 96 channels at a spacing of 50 GHz. However, as already mentioned, the new system may be configured to use a flexible grid so that the channel plan in FIG. 5c represents a possible example only. As apparent from this Figure, the new system also uses an OSC, designated as OSC2, at 1510 nm, i.e. at the same wavelength as the OSC of the existing system, which is designated as OSC1.

As shown in FIG. 5b, during the migration phase, the existing optical WDM transmission system continues to transmit its data traffic within the 80 channels at optical frequencies of 192,000 GHz to 195,950 GHz at the spacing of 50 GHz. The new optical WDM transmission system operates in the extension band only and, in the example shown, provides 12 channels at optical frequencies of 191,200 GHz to 191,750 GHz.

The wavelengths of the OSCs (OSC1, OSC2) are converted, during the migration phase, to optical frequencies of 191,900 GHz and 191,850 GHz, respectively, i.e. to optical frequencies lying in the extension band, too. An unused channel is provided between the OSCs and the neighboring data channels in order to enable an easier optical filtering, i.e. separation of the OSC channel signals and the neighboring bands covered by the channel signals. In this way, it is possible to avoid interferences as in the example according to FIG. 6 both systems, the existing and the new optical WDM transmission system, use an OSC at 1510 nm. It would of course be sufficient to convert the wavelength of one of the OCSs (OSC1, OSC2) to avoid such interferences.

This frequency (and wavelength) scheme clearly shows that the new system is able to take over all traffic relations step by step (in this context, the term "traffic" relation shall mean any type of connection between two end points, so that each service (independent of its nature) shall be referred to as constituting a traffic relation), without the need to replace the whole existing system by the new system in a single step. It is not even necessary to switch all traffic relations between two selected clients in one step from the existing system to the new system.

FIG. 5c shows the situation at the end of the migration phase when all traffic relations have been switched to the new system and only the new system is connected to the network paths. In this situation, the new system is allowed to use the band of the existing system, too.

In the following, specific structures for an optical migration filter device will be discussed with respect to FIGS. 6, 7 and 8.

Figure 6:
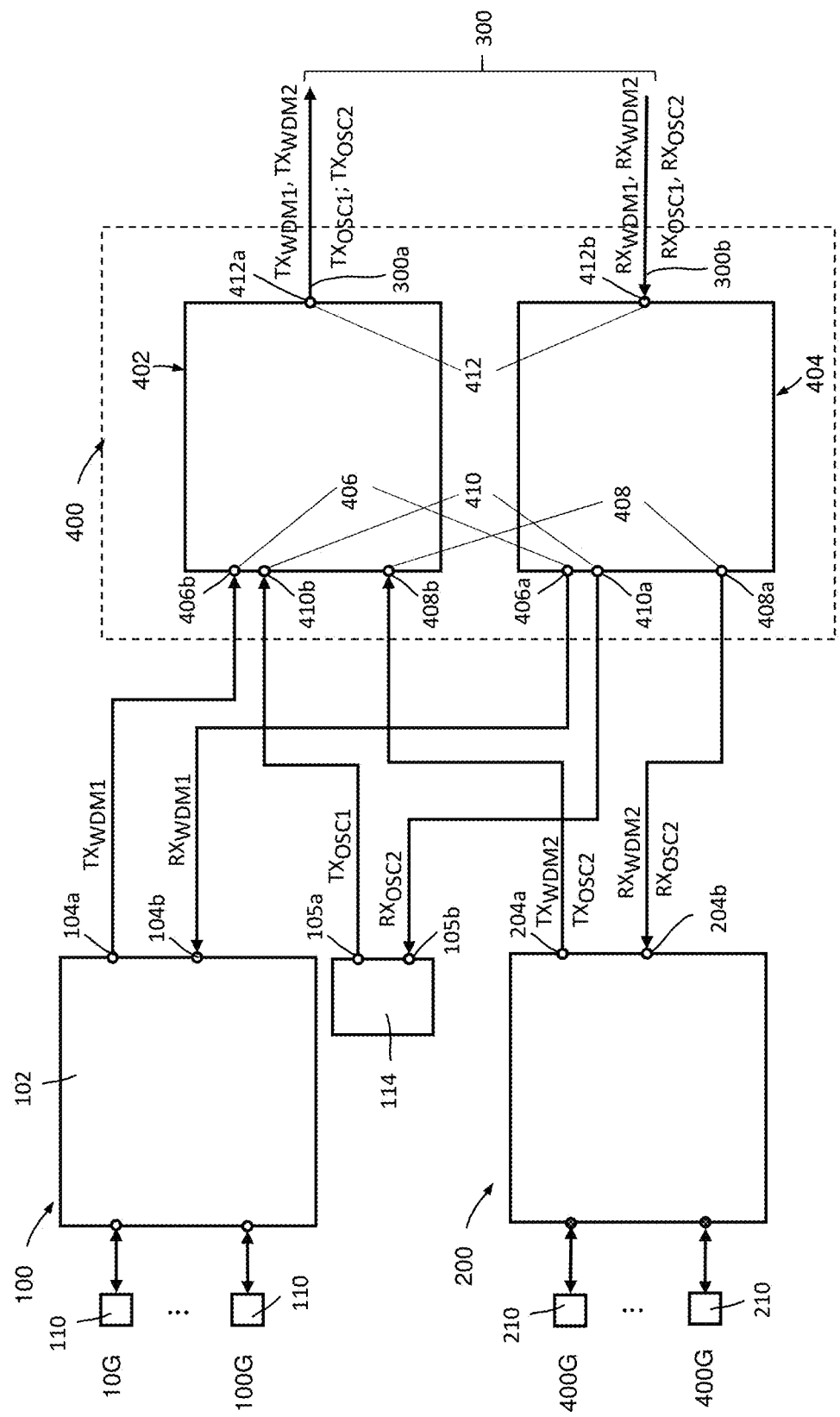
FIG. 6 shows a schematic block diagram illustrating a network node of the existing optical WDM transmission system and a network node of the new optical WDM transmission system connected to the dedicated optical network path by means of an optical migration filter device according to the invention.

FIG. 6 shows a schematic block diagram of the network structure at a given network location during the migration phase. This structure comprises the network nodes 100 and 200 of the existing and the new optical WDM transmission systems, wherein, as in FIGS. 1 and 3, only a single network interface 102, 202 of the network nodes 100, 200 is shown. The structure further comprises an optical migration filter device 400 consisting of a downstream migration filter device 402 and an upstream migration filter device 404. The output port 104a of the WDM interface port 104 of the network interface 102 is connected to an input port 406b of a first local port 406 of the optical migration filter device 400, and the input port 104b of the WDM interface port 104 of the which is provided in the first and/or second optical upstream path the optical migration filter device 400. The connections are realized by optical paths, e.g. by optical patch cables. The optical ports may be realized by optical connectors configured to match with the connectors at the respective ends of the optical patch cables. This is true for all optical connections between the network interfaces 102, 202 and the optical migration filter device 400. Likewise, the output port 204a of the WDM interface port 204 of the network interface 202 is connected to an input port 408b of a second local port 408 of the optical migration filter device 400, and the input port 204b of the WDM interface port 204 of the network interface 202 is connected to an output port 408a of the second local port of the optical migration filter device 400. Further, the output port 105a of the OSC interface port 105 of the network interface 102 is connected to an input port 406b of an OSC port 410 of the optical migration filter device 400, and the input port 105b of the OSC interface port 205 of the network interface 102 is connected to an output port 410 of the OSC port 410 of the optical migration filter device 400. An output port 412a of a remote port 412 of the optical migration filter device 400 is connected to the downstream path 300a of the optical network path 300, and an input port 412b of the remote port 412 of the optical migration filter device 400 is connected to the upstream path 300b of the optical network path 300.

In embodiments in which the network interface 202 reveals a structure corresponding to the network interface 102 comprising a separate OSC interface port, the optical migration filter device 400 comprises a further OSC port. It is of course also possible that the existing optical WDM transmission system comprises network nodes, wherein each of the network interfaces 102 reveals the structure corresponding to the network interface 202 without a separate OSC interface port (i.e. the OSC signal is output at the WDM port). In such embodiments, the optical migration filter device 400 merely comprises a first and second local port.

As already apparent from the above description, the optical migration filter device 400 is configured to output the downstream WDM signals $TX_{WDM1}$, $TX_{WDM2}$ created by the network interfaces 102, 202, which are received at the input ports 406b, 408b of the first and second local port, at the output port 412a of the remote port 412. The optical migration filter device 400 is further configured to output the upstream WDM signals $RX_{WDM1}$, $RX_{WDM2}$, which are received at the input port 412b of the remote port 412, at the output ports 406a, 408a of the first and second local port.

Figure 7:
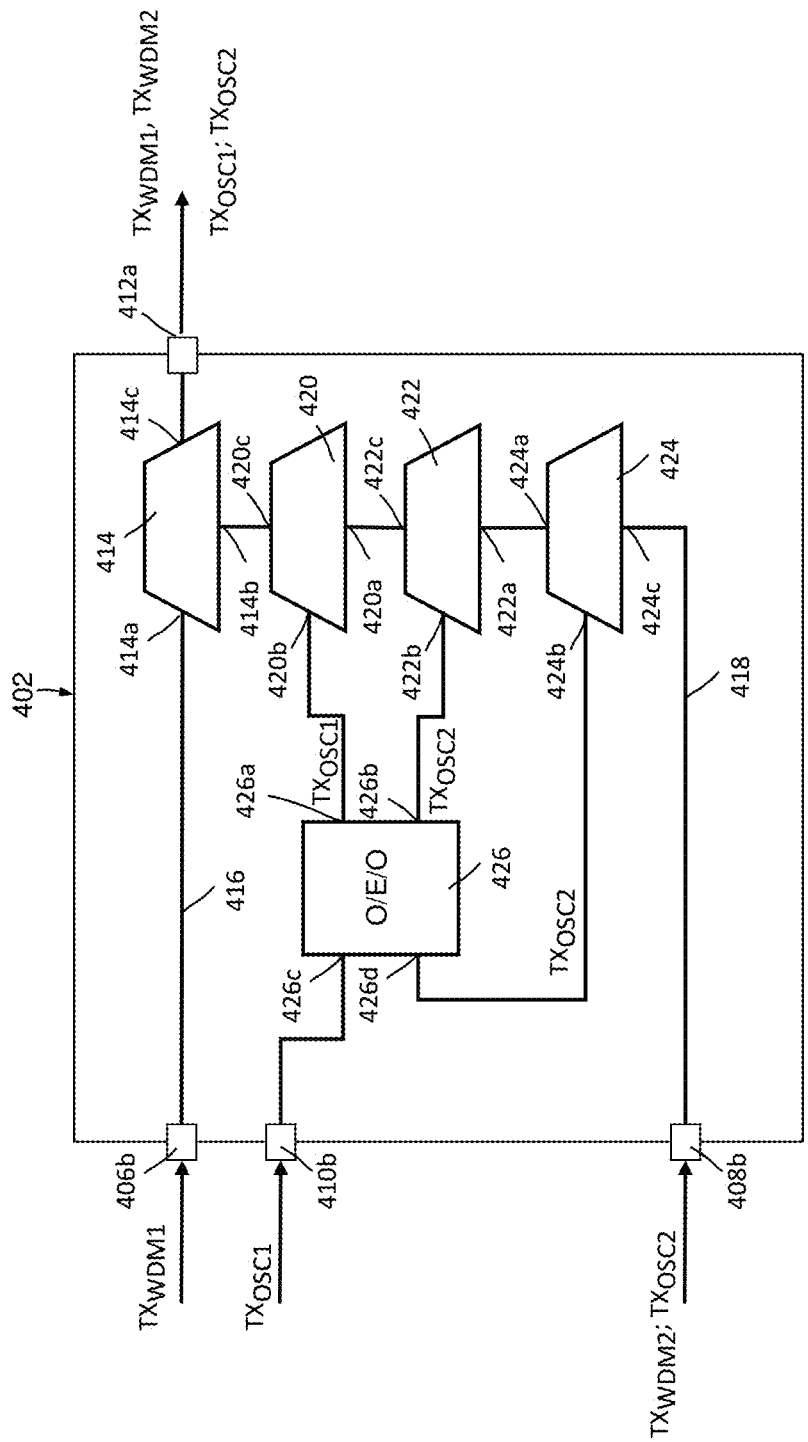
FIG. 7 shows a schematic block diagram of an embodiment of a downstream migration filter device comprised by an optical migration filter device according to the invention.

FIG. 7 shows a schematic block diagram of an embodiment of the downstream migration filter device 402 in FIG. 6 comprising an optical combining filter means 414, e.g. an optical diplexer, for combining an optical downstream path 416 that connects the input port 406b and a first combining port 414a of the optical filter means 414 and an optical downstream path 418 that connects the input port 408b and a second combining port 414b of the optical filter means 414. A multiplex port 414c of the optical filter means 414 is connected to the output port 412a of the downstream migration filter device 402.

Within the optical path 418, three further 3-port optical filter means 420, 422 and 424 are provided, which may be realized as optical diplexers. A multiplex port 420c of the optical filter means 420 is connected to a second combining port 414b of the optical filter means 414. A first combining port 420a of the optical filter means 420 is connected to a multiplex port 422c of the optical filter means 422. A second combining port 420b is connected to a first output port 426a of an optical-to-electrical-to-optical converter device 426. A first combining port 422a of the optical filter means 422 is connected to a first demultiplex port 424a of the optical filter means 424. A second demultiplex port 424b of the optical filter means 424 is connected to a second output port 426b of the optical-to-electrical-to-optical converter device 426. A multiplex port 424c of the optical filter means 424 is connected to the input port 408b of the downstream migration filter device 402. A first input port 426c of the optical-to-electrical-to-optical converter device 426 is connected to the input port 410b and a second input port 426d of the optical-to-electrical-to-optical converter device 426 is connected to a second demultiplex port 424b of the optical filter means 424.

In the following, the function of the optical downstream migration filter device 402 will be briefly described. The downstream WDM signal $TX_{WDM1}$ created by the respective network interface 102 of the network node 100 of the existing optical WDM transmission system is received at the input port 406b. The optical filter means 414 combines the signals $TX_{WDM1}$ and $TX_{OSC1}$ (for simplicity, the same designations are used for the non-wavelength-converted OSC signals and the wavelength-converted OSC signals) and feeds these signals to the output port 412a.

The downstream WDM signal $TX_{WDM2}$ and the (non-wavelength-converted) OSC signal $TX_{OSC2}$ created by the respective network interface 202 of the network node 200 of the new optical WDM transmission system are received at the input port 408b. The optical filter means 424 demultiplexes these signals and feeds the OSC signal $TX_{OSC2}$ to the optical-to-electrical-to-optical converter device 426, which is configured to convert the wavelength of the OSC signal $TX_{OSC2}$ to a conversion wavelength $\lambda_{OSC2,c}$. The optical filter means 422 multiplexes the wavelength-converted OSC signal $TX_{OSC2}$ and the downstream WDM signal $TX_{WDM2}$ which is passed through by the optical filter means 424.

Further, the downstream OSC signal $TX_{OSC1}$ of the OSC channel OSC1 of the existing system is received at the input port 410b. The optical-to-electrical-to-optical converter device 426 is configured to convert the wavelength of the OSC signal $TX_{OSC1}$ to a conversion wavelength $\lambda_{OSC1,c}$. The wavelength-converted OSC signal $TX_{OSC1}$ is multiplexed with the WDM signal $TX_{WDM2}$ and the wavelength-converted OSC signal $TX_{OSC1}$ by the optical filter means 420. Finally, all these signals are multiplexed by the optical filter means 414 with the WDM signal $\lambda_{OSC1,c}$. Thus, both downstream WDM signals $TX_{WDM1}$, $TX_{WDM2}$ and both wavelength-converted OSC signals $TX_{OSC1}$ and TXosc2 are output at the output port 4012a, which is connected to the downstream path 300a of the respective optical network path 300.

Of course, all signal connections shown in FIG. 7 are optical paths that may be realized in any appropriate manner, e.g. by integrated optical paths if the filter means are realized in integrated optics.

As apparent from FIG. 5, the conversion wavelengths $\lambda_{OSC1,c}$, $\lambda_{OSC2,c}$ of both OSC channels OSC1, OSC2 are chosen in such a way that the OSC channels are neighboring each other and all the channels of the WDM signal $TX_{WDM2}$ lie on one side within the extension band. As the optical frequency of the converted OSC channel signal $TX_{OSC2}$ is higher than the optical frequency of the converted OSC channel signal $TX_{OSC1}$, simple optical diplexers can be used as optical filter means 422 and 420. It shall be mentioned that the two channels between the neighboring OSC channels OSC1 and OSC2 are used in order to avoid any crosstalk between the OSC channels and the channels used by the existing and the new optical WDM transmission system.

Figure 8:
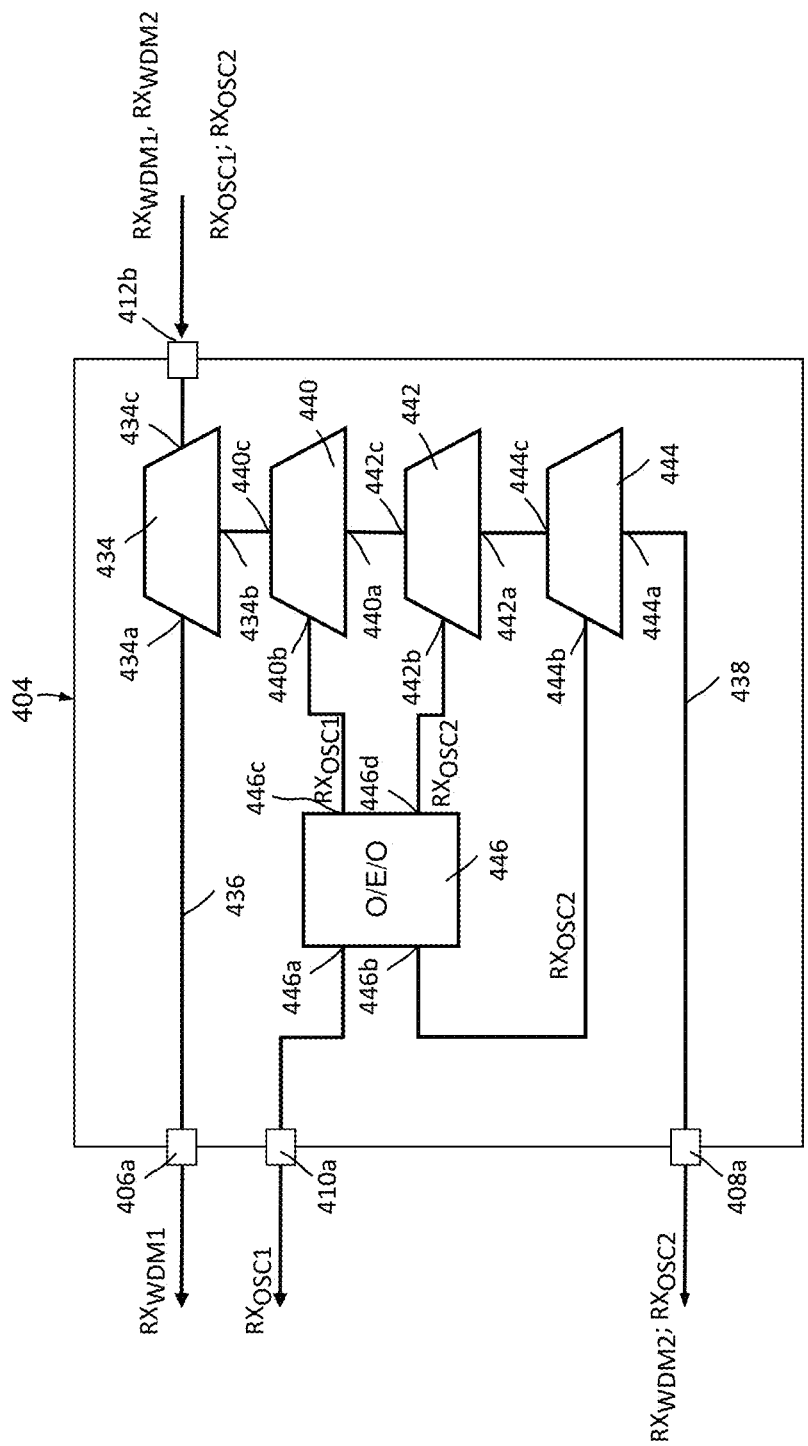
FIG. 8 shows a schematic block diagram of an embodiment of an upstream migration filter device comprised by an optical migration filter device according to the invention.

The function of the upstream migration filter device 404 shown in FIG. 8 corresponds to the function of the downstream migration filter device 402, wherein the signal directions are reversed. It has the same structure as the downstream migration filter device 400 and may comprise identical, merely optical components, i.e. a first and a second optical upstream paths 434, 438 and optical filter means 434, 440, 442 and 444 having identical filter capabilities. The upstream migration filter device 404 further comprises an optical-to-electrical-to-optical converter device 446 which operates in the reversed direction, i.e. it receives signals at input ports 446a and 446b connected to the second optical upstream path 438, and which converts the conversion wavelengths $\lambda_{OSC1}$, $\lambda_{OSC2}$ of the upstream OSC signals $RX_{OSC1}$, $RX_{OSC2}$ into the non-converted wavelengths $\lambda_{OSC1}$, $\lambda_{OSC2}$. In all other respects of the function of the upstream migration filter device 404, reference is made to the above explanations concerning the downstream migration filter device 402, wherein all reference numbers relating to the downstream migration filter device 402 is to be replaced by reference numbers which are increased by 20 and wherein the designation "combining port" is to be replaced by "demultiplex port" and vice versa.

As is apparent from FIGS. 5 to 8, the filter edge of a diplexer realizing the optical filter means 414 and 434 is chosen in such a way that the optical transmission band used by the existing optical WDM transmission system is separated from or combined with the extension band used by the new optical WDM transmission system during the migration phase (as, in the embodiment shown in the Figures, the OSCs are included in the extension band). The filter edge of a diplexer realizing the optical filter means 420 and 440 lies between the wavelength-converted OSC channels OSC1 and OSC2. The filter edge of a diplexer realizing the optical filter means 422 and 442 lies between the optical band used by the downstream and upstream WDM signal and the OSC channel OSC2. The filter edge of a diplexer realizing the optical filter means 424 and 444 may be chosen in such a way that it lies somewhere within the rather large band gap between the extension band and the OSC channel OSC2.

In other embodiments, the optical filter means 416 and 434 may be designed in such a way that one or both OSC channels are received from or passed through the first optical paths 416 and 434, whereas the remaining OSC channels are received from or passed through to the second optical paths 418 and 438, respectively.

In the embodiment shown in the drawings, no change of the network nodes 100 of the existing system is required as the insertion loss of the optical filter means 216, 218, which are omitted during the migration phase, essentially corresponds to the insertion loss of the optical filter means 414 and 434 of the optical migration filter device 400. Thus, no adjustment of the optical power of the downstream WDM signal transmitted or an adjustment of optical amplifiers for the upstream WDM signal received is necessary. The cascaded optical filter means 414, 420, 422, 424 and 434, 440, 442, 444 add approximately 3 DB additional loss which can easily be compensated by optical amplifiers as, during the migration phase, the new optical WDM transmission system is operated with a bandwidth restricted to the extension band.

LIST OF REFERENCE SIGNS

100 network node of the existing WDM transmission system
102 network interface
104 WDM interface port
104a output port
104b input port
105 OSC interface port
105a output port
105b input port
106 wavelength-selective switch
108 multiplexing and demultiplexing device
110 client
112 optical switch
114 control and management device
116 optical filter means, optical diplexer
118 optical filter means, optical diplexer
120 management block
200 network node of the new WDM transmission system
202 network interface
204 WDM interface port
204a output port
204b input port
206 wavelength-selective switch
208 multiplexing and demultiplexing device
210 client
212 optical switch
214 control and management device
216 optical filter means, optical diplexer
218 optical filter means, optical diplexer
300 optical network path
300a downstream path
300b upstream path
400 optical migration filter device
402 downstream migration filter device
404 upstream migration filter device
406 first local port
406a output port
406b input port
408 second local port
408a output port
408b input port
410 OSC port
410a output port
410b input port
412 remote port
412a output port
412b input port
414 optical filter means
414a first combining port
414b second combining port
414c multiplex port
416 optical downstream path
418 optical downstream path
420 optical filter means
420a first combining port
420b second combining port
420c multiplex port
422 optical filter means
422a first combining port
422b second combining port
422c multiplex port
424 optical filter means
424a first demultiplex port
424b second demultiplex port
424c multiplex port
426 optical-to-electrical-to-optical converter device
426a output port
426b output port
426c input port
426d input port 434 optical filter means
434a first demultiplex port
434b second demultiplex port
434c multiplex port
436 optical downstream path
438 optical downstream path
440 optical filter means
440a first demultiplex port
440b second demultiplex port
440c multiplex port
442 optical filter means
442a first demultiplex port
442b second demultiplex port
442c multiplex port
444 optical filter means
444a first demultiplex port
444b second demultiplex port
444c multiplex port
446 optical-to-electrical-to-optical converter device
446a output port
446b output port
446c input port
446d input port
$RX_{WDM1}$ upstream WDM signal of the existing optical WDM transmission system
$TX_{WDM1}$ downstream WDM signal of the existing optical WDM transmission system
$RX_{OSC1}$ upstream OSC signal of OSC channel OSC1 of the existing WDM transmission system
$TX_{OSC1}$ downstream OSC signal of OSC channel OSC1 of the existing WDM transmission system
OSC1 OSC channel of the existing WDM transmission system
$RX_{WDM2}$ upstream WDM signal of the new optical WDM transmission system
$TX_{WDM2}$ downstream WDM signal of the new optical WDM transmission system
$RX_{OSC2}$ downstream OSC signal of OSC channel OSC2 of the new WDM transmission system
$TX_{OSC2}$ upstream OSC signal of OSC channel OSC2 of the new WDM transmission system
OSC2 OSC channel of the new WDM transmission system
$\lambda_{e,1}$ to $\lambda_{e,N1}$ wavelengths of channel signals no. 1 to N1 of the existing optical WDM transmission system
$f_{e,1}$ to $f_{e,N1}$ optical frequencies of channel signals no. 1 to N1 of the existing optical WDM transmission system
N1 number of channels of the existing optical WDM transmission system
$\lambda_{OSC1}$ wavelength of the OSC channel signal of the existing optical WDM transmission system
$\lambda_{OSC1,c}$ conversion wavelength of the OSC channel signal of the existing optical WDM transmission system
$\lambda_{n,1}$ to $\lambda_{n,N2}$ wavelengths of channel signals no. 1 to N1 of the new optical WDM transmission system
$f_{e,1}$ to $f_{e,N1}$ optical frequencies of channel signals no. 1 to N2 of the new optical WDM transmission system
N2 number of channels of the existing optical WDM transmission system
$\lambda_{OSC2}$ wavelength of the OSC channel signal of the new optical WDM transmission system
$\lambda_{OSC2,c}$ wavelength of the OSC channel signal of the new optical WDM transmission system

The invention claimed is:

1. A method for migrating data traffic from an existing optical WDM transmission system to a new optical WDM transmission system, the existing optical WDM transmission system using a first optical transmission band and the new optical WDM transmission system being capable of using a second optical transmission band, wherein the second optical transmission band at least partially comprises the first optical transmission band and a further extension band that does not overlap with the first optical transmission band, the method comprising the steps of:
  (a) setting up, at each network node location, a network node of the new optical WDM transmission system in parallel to a respective network node of the existing optical WDM transmission system, disconnecting each network interface of the respective network node of the existing optical WDM transmission system from a respective optical network path and connecting each respective optical network path and each respective network interface of the existing and the new optical WDM transmission system to an associated optical migration filter device,
  (b) wherein each optical migration filter device is adapted
    (i) to direct incoming data traffic that is received via the respective optical network path and that uses the extension band to the network node of the new optical WDM transmission system,
    (ii) to direct outgoing data traffic originating from the network node of the new optical WDM transmission system that uses the extension band to the respective optical network path,
    (iii) to direct incoming data traffic that is received via the respective optical network path and that does not use the extension band to the network node of the existing optical WDM transmission system, and
    (iv) to direct outgoing data traffic originating from the network node of the existing optical WDM transmission system to the respective optical network path;
  (c) operating simultaneously, for the duration of a migration phase, the existing and the new optical WDM transmission system, wherein the new optical WDM transmission system uses the extension band only;
  (d) switching, during the migration phase, all traffic relationships handled by the existing optical WDM transmission system to the new optical WDM transmission system;
  (e) removing, at each network node location, all optical migration filter devices and connecting all optical network paths to the respective network interfaces of the network node of the new optical WDM transmission system when all traffic relationships handled by the respective network node of the existing system or when all traffic relationships handled by the existing optical WDM transmission system have been switched to the new optical WDM transmission system.

2. The method according to claim 1, wherein each network node of the new optical WDM transmission system has the ability to take over the whole functionality of the respective node of the existing optical WDM transmission system as far as transmitting the respective traffic relationships is concerned, including the ability to connect a respective number of local clients to a given number of local communication ports, wherein each communication port is configured to enable at least one client to receive data traffic from and/or transmit data traffic to at least one predetermined network interface of the network node.

3. The method according to claim 2, wherein each of the existing and the new optical WDM transmission systems uses an optical supervisory channel (OSC1; OSC2) at a predetermined wavelength (λosc1) and that, during the migration phase, (a) the wavelength (λosc1; λosc2) of the optical supervisory channel signal transmitted by at least one of the existing or new optical WDM transmission systems is shifted by the optical migration filter device to a respective differing conversion wavelength (λosc1,c; λosc2,c) by converting the respective optical supervisory channel signal (TXosc1; TXosc2) into an electrical signal and converting the electrical signal into an optical supervisory channel signal (TXosc1; TXosc2) at the respective conversion wavelength (λosc1,c; λosc2,c); and (b) the conversion wavelength (λosc1,c; λosc2,c) of an optical supervisory channel (OSC1; OSC2) received by at least one of the existing or new optical WDM transmission systems is shifted by the optical migration filter device to a respective differing non-conversed wavelength (λosc1; λosc2) by converting the respective optical supervisory channel signal (TXosc1; TXosc2) into an electrical signal and converting the electrical signal into an optical supervisory channel signal (TXosc1; TXosc2) at the respective non-converted wavelength (λosc1; λosc2).

4. The method according to claim 1, wherein each of the existing and the new optical WDM transmission systems uses an optical supervisory channel (OSC1; OSC2) at a predetermined wavelength (λosc1) and that, during the migration phase,
(a) the wavelength (λosc1; λosc2) of the optical supervisory channel signal transmitted by at least one of the existing or new optical WDM transmission systems is shifted by the optical migration filter device to a respective differing conversion wavelength (λosc1,c; λosc2,c) by converting the respective optical supervisory channel signal (TXosc1; TXosc2) into an electrical signal and converting the electrical signal into an optical supervisory channel signal (TXosc1; TXosc2) at the respective conversion wavelength (λosc1,c; λosc2,c); and
(b) the conversion wavelength (λosc1,c; λosc2,c) of an optical supervisory channel (OSC1; OSC2) received by at least one of the existing or new optical WDM transmission systems is shifted by the optical migration filter device to a respective differing non-conversed wavelength (λosc1; λosc2) by converting the respective optical supervisory channel signal (TXosc1; TXosc2) into an electrical signal and converting the electrical signal into an optical supervisory channel signal (TXosc1; TXosc2) at the respective non-converted wavelength (λosc1; λosc2).

5. The method according to claim 4, wherein, if required, both optical supervisory channels (OSC1; OSC2) are shifted to conversion wavelengths ($\lambda_{OSC1,c}$; $\lambda_{OSC2,c}$) lying in the extension band.

6. The method according to claim 5, wherein the existing and the new optical WDM transmission systems use an optical supervisory channel (OSC1; OSC2) at the same non-converted wavelength ($\lambda_{OSC1}$; $\lambda_{OSC2}$).

7. The method according to claim 4, wherein the conversion wavelengths (λosc1,c; λosc2,c) of the optical supervisory channel (OSC1; OSC2) of the existing and the new optical WDM transmission system are chosen in such a way that they lie within the extension band, wherein, wavelengths (λn,1 to λn,N2) of all optical communication channels of new optical WDM transmission system lie on one side of the conversion wavelengths (λosc1,c; λosc2,c).

8. The method according to claim 4, wherein the existing and the new optical WDM transmission systems use an optical supervisory channel (OSC1; OSC2) at the same non-converted wavelength ($\lambda_{OSC1}$; $\lambda_{OSC2}$).

9. The method according to claim 5, wherein the conversion wavelengths (λosc1,c; λosc2,c) of the optical supervisory channel (OSC1; OSC2) of the existing and the new optical WDM transmission system are chosen in such a way that they lie within the extension band, wherein, wavelengths (λn,1 to λn,N2) of all optical communication channels of new optical WDM transmission system lie on one side of the conversion wavelengths (λosc1,c; λosc2,c).

10. The method according to claim 4, wherein the conversion wavelengths (λosc1,c; λosc2,c) of the optical supervisory channel (OSC1; OSC2) of the existing and the new optical WDM transmission system are chosen in such a way that they lie within the extension band, wherein, wavelengths (λn,1 to λn,N2) of all optical communication channels of new optical WDM transmission system lie on one side of the conversion wavelengths (λosc1,c; λosc2,c).

11. An optical migration filter device, especially for realizing the method according to claim 1, the optical migration filter device comprising
(a) a first local port adapted to be connected to a first local optical path and to receive a first downstream WDM signal ($TX_{WDM1}$) lying in a first optical band and to output a first upstream WDM signal ($RX_{WDM1}$) lying in the first optical band,
(b) a second local port adapted to be connected to a second local optical path and to receive a second downstream WDM signal ($TX_{WDM2}$) lying in a second optical band and to output a second upstream WDM signal ($RX_{WDM2}$) lying in the second optical band, wherein the second optical band does not overlap with the first optical band, and
(c) a remote port adapted to be connected to an optical network path and to receive an upstream WDM signal comprising the upstream WDM signals ($RX_{WDM1}$; $RX_{WDM2}$) lying in the first and second optical bands as well as to output a downstream WDM signal comprising the downstream WDM signals ($TX_{WDM1}$; $TX_{WDM2}$) lying in the first and second optical bands,
(d) wherein the optical migration filter device is adapted
  (i) to combine the first and second downstream WDM signals ($TX_{WDM1}$; $TX_{WDM2}$) and to output the combined downstream WDM signal at the remote port and
  (ii) to separate a combined upstream WDM signal into the first and second upstream signals ($RX_{WDM1}$; $RX_{WDM2}$) and to output these signals at the respective first and second port, and
wherein
(e) the optical migration filter device is further adapted
  (i) to convert the wavelength ($\lambda_{OSC1}$) of a first downstream optical supervisory channel signal ($TX_{OSC1}$) that is supplied to the first local port or to a separate first OSC port into a predetermined conversion wavelength ($\lambda_{OSC1,c}$) and to output the wavelength-converted first downstream optical supervisory channel signal ($TX_{OSC1}$) at the remote port, and to convert a conversion wavelength ($\lambda_{OSC1,c}$) of a first wavelength-converted upstream optical supervisory channel signal ($RX_{OSC1}$) that is supplied to the remote port into a wavelength ($\lambda_{OSC1}$) of a first upstream optical supervisory channel signal ($RX_{OSC1}$) and to output the wavelength-converted first upstream optical supervisory channel signal ($RX_{OSC1}$) at the first local port or at the first OSC port; and/or (ii) to convert the wavelength ($\lambda_{OSC2}$) of a second downstream optical supervisory channel signal ($TX_{OSC2}$) that is supplied to the second local port or to a separate second OSC port into a predetermined conversion wavelength ($\lambda_{OSC2,c}$) and to output the wavelength-converted second downstream optical supervisory channel signal ($TX_{OSC2}$) at the remote port, and to convert a conversion wavelength ($\lambda_{OSC2,c}$) of a second wavelength-converted upstream optical supervisory channel signal ($RX_{OSC2}$) that is supplied to the remote port into a wavelength ($\lambda_{OSC2}$) of a second upstream optical supervisory channel signal ($RX_{OSC2}$) and to output the wavelength-converted second upstream optical supervisory channel signal ($RX_{OSC2}$) at the second local port or at the second OSC port.

12. The optical migration filter device according to claim 11, wherein
    (a) each of the first and second local ports comprises an input port for receiving the first and second downstream WDM signals ($TX_{WDM1}$; $TX_{WDM2}$) via a respective first and second downstream path of the first and second local optical paths that can be connected to the respective input port, and an output port for feeding the first and second upstream WDM signals ($RX_{WDM1}$; $RX_{WDM2}$) via a respective first and second upstream path of the first and second optical paths that can be connected to the respective output port,
    (b) the remote port comprises an output port for feeding the downstream WDM signal comprising the first and second downstream WDM signals ($TX_{WDM1}$; $TX_{WDM2}$) and the first and second downstream optical supervisory channel signals ($TX_{OSC1}$; $TX_{OSC2}$) to a downstream optical network path that can be connected to this output port, and an input port for receiving the upstream WDM signal comprising the first and second downstream WDM signals ($RX_{WDM1}$; $RX_{WDM2}$) and the first and second upstream optical supervisory channel signals ($RX_{OSC1}$; $RX_{OSC2}$) via an upstream optical network path that can be connected to this input port, and
    (c) each of the optional first and second OSC ports, if present, comprises an input port for receiving the respective first ($TX_{OSC1}$) and second downstream optical supervisory channel signal via a respective first or second downstream OSC path that can be connected to the respective input port, and an output port for feeding the respective first ($RX_{OSC1}$) and second upstream optical supervisory channel signal to a respective first or second upstream OSC path that can be connected to the respective output port.

13. The optical migration filter device according to claim 12, wherein it comprises a downstream migration filter device and an upstream migration filter device.

14. The optical migration filter device according to claim 13, wherein the downstream migration filter device comprises
    (a) a first optical combining filter means having a first and a second combining port and a multiplex port, the first combining port defining the or being connected to the input port of the first local port via a first optical downstream path, the second combining port defining the or being connected to the input port of the second local port via a second optical downstream path, and the multiplex port defining the or being connected to the output port of the remote port via a third optical downstream path,
    (b) wherein the first optical combining filter means is configured to output optical signals ($TX_{WDM1}$) lying in the first optical band and received at the first combining port and optical signals ($TX_{WDM1}$; $TX_{WDM2}$; $TX_{OSC2,c}$) lying in the second optical band and received at the second combining port at the multiplex port and to reflect or drop all other signals received at the first or second combining port, and
    (c) an optical-to-electrical-to-optical converter device configured to receive the first and/or the second downstream optical supervisory channel signal ($TX_{OSC1}$; $TX_{OSC2}$) at a respective first or second input port, to create the first and/or the second wavelength-converted downstream optical supervisory channel signal ($TX_{OSC1}$; $TX_{OSC2}$) and to feed one or both of the wavelength-converted downstream optical supervisory channel signals ($TX_{OSC1}$; $TX_{OSC2}$) to a second optical combining filter means, which is provided
        (i) exclusively within the first optical downstream path if the first and/or second conversion wavelength ($\lambda_{OSC1,c}$, $\lambda_{OSC2,c}$) lies in the first optical band,
        (ii) exclusively within the second optical downstream path if the first and/or second conversion wavelength ($\lambda_{OSC1,c}$, $\lambda_{OSC2,c}$) lies in the second optical band, or
        (iii) within the first and the second optical downstream path if the conversion wavelengths ($\lambda_{OSC1,c}$, $\lambda_{OSC2,c}$) lie in different of the first and second optical bands,
    (d) wherein the second optical combining filter means is configured to integrate the first and/or the second wavelength-converted downstream optical supervisory channel signal ($TX_{OSC1}$; $TX_{OSC2}$) into the first and/or second optical downstream path.

15. The optical migration filter device according to claim 14, wherein the second optical combining filter means comprises, for each downstream optical supervisory channel (OSC1, OSC2) to be wavelength-converted, an optical diplexer, which is configured to multiplex the respective downstream optical supervisory channel signal ($TX_{OSC1}$; $TX_{OSC2}$) that is supplied to the respective optical diplexer and the respective optical signal that is guided in the first or second optical downstream path and supplied to the respective optical diplexer.

16. The optical migration filter device according to claim 15, wherein the downstream migration filter device comprises a demultiplexing filter means which is provided in the first and/or second optical downstream path and which is configured to extract the first and/or the second downstream optical supervisory channel ($TX_{OSC1}$; $TX_{OSC2}$) signal from the first and/or second optical downstream path and to feed the first and/or the second downstream optical supervisory channel signal ($TX_{OSC1}$; $TX_{OSC2}$) to the optical-to-electrical-to-optical converter device.

17. The optical migration filter device according to claim 14, wherein the downstream migration filter device comprises a demultiplexing filter means which is provided in the first and/or second optical downstream path and which is configured to extract the first and/or the second downstream optical supervisory channel ($TX_{OSC1}$; $TX_{OSC2}$) signal from the first and/or second optical downstream path and to feed the first and/or the second downstream optical supervisory channel signal ($TX_{OSC1}$; $TX_{OSC2}$) to the optical-to-electrical-to-optical converter device.

18. The optical migration filter device according to claim 13, wherein the upstream migration filter device comprises
    (a) a first optical demultiplexing filter means having a first and a second demultiplex port and a multiplex port, the first demultiplex port defining the or being connected to the output port of the first local port via a first optical upstream path, the second demultiplex port defining the or being connected to the output port of the second local port via a second optical upstream path, and the multiplex port defining the or being connected to the input port of the remote port via a third optical upstream path, (b) wherein the first optical demultiplexing filter means is configured to output optical signals ($RX_{WDM1}$) lying in the first optical band and received at the multiplex port at the first demultiplex port and to output optical signals ($RX_{WDM1}$, $RX_{OSC1}$, $RX_{OSC2}$) lying in the second optical band and received at the multiplex port at the second demultiplex port and to reflect or drop all other signals received at the multiplex port, and (c) an optical-to-electrical-to-optical converter device configured to receive the first and/or the second wavelength-converted upstream optical supervisory channel signal ($RX_{OSC1}$, $RX_{OSC2}$) at a respective first and second input port from a second optical demultiplexing filter means, which is provided (i) exclusively within the first optical upstream path if the first and/or second conversion wavelength ($\lambda_{OSC1,c}$, $\lambda_{OSC2,c}$) lies in the first optical band, (ii) exclusively within the second optical upstream path if the first and/or second conversion wavelength ($\lambda_{OSC1,c}$, $\lambda_{OSC2,c}$) lies in the second optical band, or (iii) within the first and the second optical upstream path if the conversion wavelengths ($\lambda_{OSC1,c}$, $\lambda_{OSC2,c}$) lie in different of the first and second optical bands, (d) wherein the second optical demultiplexing filter is configured to extract the first and/or the second wavelength-converted upstream optical supervisory channel signal ($RX_{OSC1}$, $RX_{OSC2}$) from the first and/or second optical upstream path and to feed the first and/or the second wavelength-converted upstream optical supervisory channel signal ($RX_{OSC1}$, $RX_{OSC2}$) to the optical-to-electrical-to-optical converter device.

19. The optical migration filter device according to claim 18, wherein the second optical demultiplexing filter means comprises, for each wavelength-converted upstream optical supervisory channel (OSC1, OSC2), an optical diplexer, which is configured to extract, from the optical signal that is guided in the first and/or second optical upstream path, the first and/or second upstream optical supervisory channel signal ($RX_{OSC1}$, $RX_{OSC2}$) and to feed the first and/or second upstream optical supervisory channel signal ($RX_{OSC1}$, $RX_{OSC2}$) to the optical-to-electrical-to-optical converter device.

20. The optical migration filter device according to claim 18, wherein the upstream migration filter device comprises a multiplexing filter means which is provided in the first and/or second optical upstream path and which is configured to receive, from the optical-to-electrical-to-optical converter device, the re-converted first and/or the second upstream optical supervisory channel signal ($RX_{OSC1}$, $RX_{OSC2}$) and to integrate these signals into the first and/or second optical upstream path.

* * * * *

UNITED STATES PATENT AND TRADEMARK OFFICE
CERTIFICATE OF CORRECTION

PATENT NO. : 11,233,564 B1
APPLICATION NO. : 17/315408
DATED : January 25, 2022
INVENTOR(S) : Henning Hinderthür et al.

It is certified that error appears in the above-identified patent and that said Letters Patent is hereby corrected as shown below:

On the Title Page

Column 1, on the Line after "(22) Filed: May 10, 2021" insert -- (30) Foreign Application Priority Data Jul. 7, 2020 (EP) ....................20184579.9 --

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*